United States Patent
Gibboney, Jr.

(10) Patent No.: US 6,646,537 B1
(45) Date of Patent: Nov. 11, 2003

(54) SOLID STATE RECTIFYING FUSE

(75) Inventor: James W Gibboney, Jr., Conyers, GA (US)

(73) Assignee: Ventur Research & Development Corp., Suwanee, GA (US)

( * ) Notice: Subject to any disclaimer, the term of this patent is extended or adjusted under 35 U.S.C. 154(b) by 1053 days.

(21) Appl. No.: 09/093,248

(22) Filed: Jun. 8, 1998

Related U.S. Application Data

(63) Continuation-in-part of application No. 08/847,345, filed on Mar. 24, 1997, now Pat. No. 5,777,868.

(51) Int. Cl.⁷ .............................................. H01H 85/04
(52) U.S. Cl. ...................................................... 337/164
(58) Field of Search ......................................... 337/164

(56) References Cited

U.S. PATENT DOCUMENTS

| | | | |
|---|---|---|---|
| 3,789,211 | A | 1/1974 | Norman |
| 3,953,782 | A | 4/1976 | Means |
| 3,968,398 | A | 7/1976 | Lehmann et al. |
| 4,075,614 | A | 2/1978 | White |
| 4,080,039 | A | 3/1978 | Ahroni |
| 4,227,228 | A | 10/1980 | Cheng |
| 4,350,407 | A | 9/1982 | Tong |
| 4,418,978 | A | 12/1983 | Shamir |
| 4,592,613 | A | 6/1986 | Tong |
| 4,623,878 | A | 11/1986 | Schoenwetter |
| 4,675,575 | A | 6/1987 | Smith et al. |
| 4,688,135 | A | 8/1987 | Leopold |
| 4,799,898 | A | 1/1989 | Schick |
| 4,997,393 | A | 3/1991 | Armando |
| 5,077,534 | A | * 12/1991 | Douglass .................... 337/164 |
| 5,111,113 | A | 5/1992 | Chu |
| 5,139,443 | A | 8/1992 | Armando |
| D330,172 | S | 10/1992 | Rihm |
| 5,160,879 | A | 11/1992 | Tortola et al. |
| D341,331 | S | 11/1993 | Richards, Jr. |
| 5,320,563 | A | 6/1994 | Liao |
| 5,345,147 | A | 9/1994 | Wu |
| 5,384,559 | A | 1/1995 | Shamir |
| 5,396,221 | A | 3/1995 | Bridges |
| 5,419,719 | A | 5/1995 | Chandler |

\* cited by examiner

*Primary Examiner*—Wael Fahmy, Jr.
*Assistant Examiner*—Douglas A. Wille
(74) *Attorney, Agent, or Firm*—Michael A. Mann; William Y. Klett, III; Nexsen Pruet Jacobs Pollard, LLC

(57) ABSTRACT

A single circuit element, referred to as a solid state rectifying fuse (SSRF), rectifies an incoming AC signal and opens the circuit if a programmed maximum current level is reached. The anode or cathode depending upon the particular application is designed with a plurality of conductors strips in electrical contact with the P or N region, respectively. Conductor strips are composed of a material that melts open if the current limit is exceeded. Conductor strips are designed to have a lower total current handling capacity than that of the PN junction so that the current is reduced or terminated before the PN junction can "short." Depending on the desired maximum current of the SSRF, the current limit can be adjusted downward by burning out or severing some of the conductors. In this sense, it is a programmable diode.

10 Claims, 1 Drawing Sheet

SOLID STATE RECTIFYING FUSE

This application is a continuation-in-part application of Ser. No. 08/847,345 which was filed Mar. 24, 1997 now U.S. Pat. No. 5,777,868.

BACKGROUND OF THE INVENTION

1. Field of the Invention

The present invention relates to electrical circuit elements; in particular, the present invention relates to circuit elements for rectifying and limiting current from an alternating current (AC) source.

2. Discussion of Background

Except for devices that are solely battery operated, most electronic devices receive power using alternating current (AC). FIG. 1A illustrates a graph of voltage versus time of an alternating current, meaning that the current reverses the direction of flow. So-called household current varies between approximately ±60 volts and does so at approximately 60 times per second. Unfortunately, since an AC signal will damage many electronic devices, this signal must be rectified to direct current (DC). Direct current does not change direction, although it may change amplitude as seen in FIG. 1B.

Diodes, solid state circuit elements that conduct current in forward bias but not in reverse bias, commonly are used in circuits to rectify an alternating current (AC) signal. For half-wave rectification, as illustrated in FIG. 1B, a single diode can exclude negative voltages, leaving only positive voltages. For full-wave rectification, as illustrated in FIG. 1C, two or four diodes are used.

Diodes have current limit ratings based on the maximum amount of current that can be handled. If the current limit is exceeded, the diode will no longer function as a rectifier, but as a straight wire conductor. During this "shorted" state, full wave AC will pass through the diode into the targeted product. As a result, many of the costly integrated circuits and other electronic components will be damaged or destroyed. More importantly, a "shorted" diode poses serious safety risks. For example, power supplies often use capacitors to filter the rectified signal to reduce any possible hum or buzzing noise. If full wave AC is allowed to pass to the filter, the capacitors may explode.

Various circuits have been devised to reduce the potential threat of a "shorted" diode. These circuits use other circuit elements to open the circuit if a diode is "shorted." Fuses are commonly placed in circuits using diodes so that the fuse will open the circuit before the current limit on the diodes is reached. Also, "shunt" circuits are used which purposely blow a fuse if a diode has "shorted." Although these circuits protect the device from damage in the event that a diode "shorts," additional circuit elements increase overall costs. Moreover, a myriad of fuses with various current ratings must be inventoried to be prepared for differing applications. Therefore there is a need for a single circuit element that not only rectifies an AC signal, but also opens the circuit when a programmed current limit is reached.

SUMMARY OF THE INVENTION

According to its preferred embodiments and briefly described, the present invention is a solid state rectifying fuse (SSRF), or "Gibboney" diode, after the inventor. The SSRF rectifies an incoming AC signal and opens the circuit if a programmed maximum current level is reached. The anode or cathode depending upon the particular application is designed with a plurality of conductor strips in electrical contact with the P or N region, respectively. Conductors are composed of a material that melts open if the current limit is exceeded. Conductors are designed to have a lower total current handling capacity than that of the PN junction so that the current is reduced or terminated before the PN junction can "short." Depending on the desired maximum current of the SSRF, the current limit can be adjusted downward by burning out or severing a portion of the conductors. In this sense, it is a "programmable" diode.

A major feature of the present invention is the ability to not only rectify an incoming signal, but also to open the current path if a programmed current limit is exceeded. Unlike typical diodes that "short" or function as a straight wire connection if the current limit is exceeded, the present invention incorporates a plurality of conductors into the diode that open the current path if a programmed current limit is reached. In this way, the SSRF is both a diode and a programmable fuse in one circuit element.

A major advantage of the present invention is a resulting increase in safety not only for a person handling the circuit but also to reduce the possibility of damaging circuit components. Unlike typical diodes that may pass a full wave AC signal through the circuit if the current limit is reached, the present invention will open the current path to prohibit the passage of AC to other components in the circuit. Moreover, if the programmed current limit is exceeded, persons handling the circuit will not be exposed to AC.

Another important advantage of the present invention is lower overall costs. The costs added by fuses, fuse holders and the like are not necessary with circuits using the SSRF since it also functions as a fuse. Moreover, since the SSRF may be programmed for various current limits, the number of diodes that manufacturers must inventory is significantly reduced.

Another important feature of the present invention is the ability, to program for a specific current handling limits. A SSRF may be manufactured to open the current path when a particular current level is reached. This current limit may be adjusted downward to a desired current limit by burning out or severing a portion of the conductors.

Other features and their advantages will be apparent to those skilled in the art from a careful reading of the Detailed Description of Preferred Embodiments accompanied by the following drawings.

BRIEF DESCRIPTION OF THE DRAWINGS

In the figures.

DETAILED DESCRIPTION OF PREFERRED EMBODIMENTS

Figure 1A:
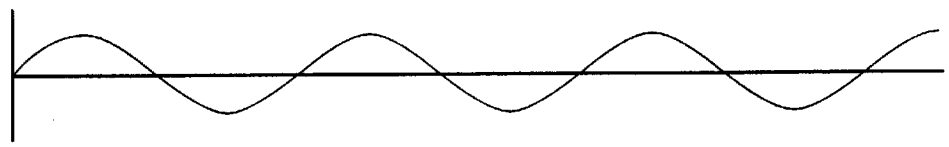
FIGS. 1A, 1B and 1C are graphs illustrating, respectively, alternating current, half-wave pulsed direct current and full-wave pulsed direct current versus time.
Figure 1B:
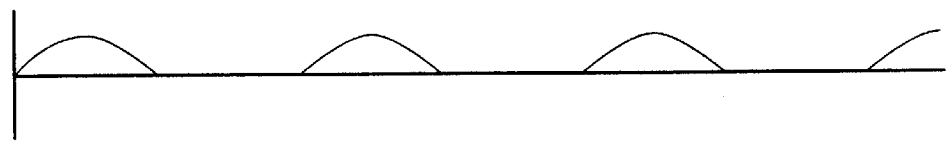
Figure 1C:
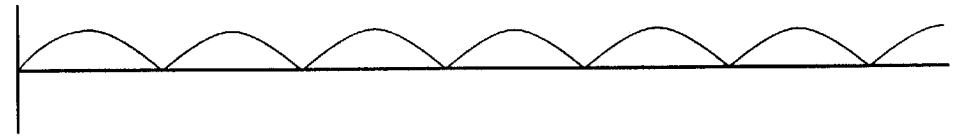
Figure 2A:
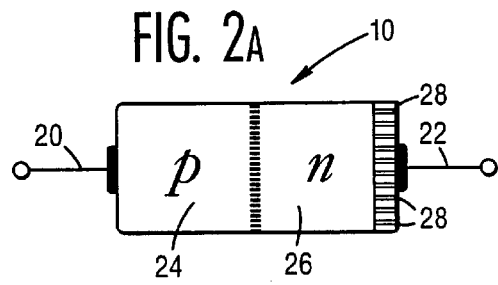
FIG. 2A is schematic view of a SSRF with conductors on the cathode, according to a preferred embodiment of the present invention.
Figure 2B:
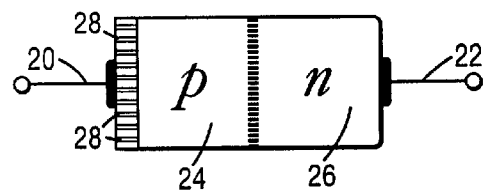
FIG. 2B is schematic view of a SSRF with conductors on the anode, according to a preferred embodiment of the present invention.
Figure 2C:
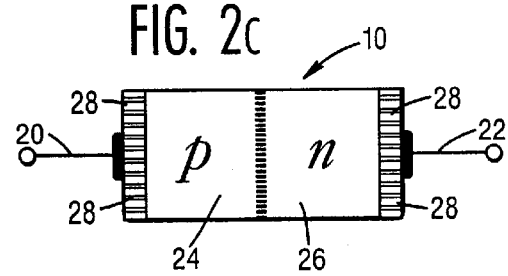
FIG. 2C is schematic view of a SSRF with conductors on both the anode and cathode, according to a preferred embodiment of the present invention.

The present invention is an electrical circuit element for rectifying and limiting current from an AC source. In particular, the present invention relates to a rectifier that opens the current path if a programmed maximum current level is reached. It will be clear to those familiar with rectifying circuits, that the solid state rectifying fuse (SSRF) could be used in any application in which a diode or fuse could be used, SSRF, generally referred to by reference number 10, comprises an anode 20, cathode 22, p region 24, n region 26, and a plurality of conductor strips 28.

SSRF 10 comprises an anode 20 in electrical connection with p region 24 and cathode 22 in electrical connection with n region 26. The n region 26 and p region 24 of SSRF 10 is formed from a semiconductor material. Although any semiconductor material could be used such as geranium, silicon preferably is used. P region 24 is doped with a p-type material such as boron or aluminum; while n region 26 is doped with a n-type material such as antimony or phosphorus. The interaction of p region 24 with n region 26 results in a forward current if a positive voltage is applied to anode 20 with respect to cathode 22, while almost no reverse current results if a positive voltage is applied to cathode 22 with respect to anode 20. It will be clear to those familiar with semiconductor fabrication that many different semiconductor materials and doping levels can be used to allow a forward current if a positive voltage is applied to p region 24 with respect to n region 26, while allowing almost no current to flow if a positive voltage is applied to the n region 26 with respect to the p region 24.

Anode 20 and cathode 22 are in electrical connection with p region 24 and n region 26, respectively. Either the anode 20 and/or cathode 22 are formed to have a plurality of conductor strips 28. This means that either anode 20 or cathode 22 or both could be formed to have a plurality of conductor strips 28. If either anode 20 or cathode 22 is formed with a plurality of conductor strips 28 instead of both, the size of SSRF 10 is reduced. Although conductor strips 28 could be used on both the anode 20 and cathode 22, preferably conductor strips 28 are used on the opposite junction of the load to protect the junction. In other words, if SSRF 10 is used to rectify a positive voltage, the anode 20 would have conductor strips 28 since the cathode 22 is connected to the load.

The PN junction can handle a maximum current level before "shorting" or functioning as a straight wire conductor. Conductor strips 28 can carry a maximum current level before melting open like a fuse. The maximum current level of conductor strips 28 must be less than the maximum current level of PN junction so that the current path will open before damage to the PN junction is caused. Conductor strips 28 can be made from various materials, such as aluminum, copper, germanium, gallium arsenide, gallium, and other like materials. The maximum current level of conductor strips 28 can be varied by material choice, cross-sectional area, and the number of conductor strips 28. In choosing a material, the resistivity and melting point should be taken into consideration in determing the maximum current level handled before melting. Also, the maximum current level is affected by cross sectional area of the conductor strips 28 and the thermal impedance of the material encasing the SSRF 10. Depending upon the operating characteristics and current handling limits, different materials may be chosen. For example, copper conductor strips 28 may be chosen for an application requiring a relatively high current level and high operating temperature since copper has a relatively low resistivity and high melting point. The choice of material for and corresponding size of conductor strips 28 will be clear to one skilled in the art of semiconductor fabrication. These conductor strips 28 are preferably on the order of one to ten microns in thickness; however, the size of conductor strips 28 may vary depending upon the desired current handling limits and operating environment. Also, the size of conductor strips 28 may be smaller as technology permits.

The maximum allowable current of SSRF 10 may be programmed by burning out or severing a portion of the strips. SSRF 10 can be manufactured with a nominal rating of one or more amperes. Since the maximum current level of SSRF 10 is dependent on the total number of conductor strips 10, the maximum allowable current may be adjusted downward from the nominal rating by burning or severing a portion of the strips. The portion of conductor strips 28 that are severed can be calculated by finding the total current handling of each conductor strip by dividing the initial number of conductor strips by the total maximum current handling of the SSRF 10 with that number. For example, for a SSRF 10 with a 1 ampere maximum current handling containing 100 conductor strips 28, each conductor strip 28 could handle a maximum current of 10 mA. If a SSRF with 400 mA current handling is required, then 60 conductor strips 28 should be severed. Although any source of heat may burn out a number of conductor strips 28, preferably a laser is used.

It will be clear to those skilled in the art that many modifications and substitutions can be made to the foregoing preferred embodiments without departing from the spirit and scope of the invention, which is defined by the following claims.

What is claimed is:

1. An electrical circuit element for use with an electrical circuit, said circuit element comprising:
   an anode;
   a cathode; and
   rectifying means in electrical connection with said anode and said cathode for rectifying the current in said circuit as said current passes between said anode and said cathode, said anode including fuse means for opening said circuit if a preselected current limit is reached.

2. The electrical circuit element as recited in claim 1, wherein said rectifying means further comprises:
   a p-region in electrical connection with said anode; and
   a n-region in electrical connection with said p-region, said n-region in electrical connection with said p-region so forward current flows from said p-region to said n-region but no reverse current flows from said n-region to said p-region.

3. The electrical circuit element as recited in claim 1, wherein said fuse means further comprises a plurality of conductor strips arranged electrically in parallel with each other and in series with said anode, so that if the current reaches a preselected limit, said plurality of conductor strips opens to limit current passed by said circuit.

4. The electrical circuit element as recited in claim 1, wherein said fuse means further comprises a plurality of conductor strips arranged electrically in parallel with each other and in series with said anode, so that if the current reaches a preselected current limit, said plurality of conductor strips opens to limit current passed by said circuit, said current limit programmed by severing a portion of said plurality of conductor strips.

5. The electrical circuit element as recited in claim 1, wherein said fuse means further comprises a plurality of conductor strips arranged electrically in parallel with each other and in series with said anode, so that if the current reaches a preselected limit, said plurality of conductor strips opens to limit current passed by said circuit, said conductor strips being made of a material selected from the group consisting of germanium, gallium arsenide, copper, and aluminum.

6. The electrical circuit element as recited in claim 1, wherein said fuse means further comprises a plurality of conductor strips arranged electrically in parallel with each other and in series with said anode, so that if the current reaches a preselected limit, said plurality of conductor strips opens to limit current passed by said circuit, wherein each conductor strip of said plurality of conductor strips is between 1 and 10 microns in thickness.

7. An electrical circuit element for use with an electrical circuit, said circuit element comprising:

- an anode;
- a cathode;
- a p-region in electrical connection with said anode;
- a n-region in electrical connection with said p-region, said n-region in electrical connection with said p-region so forward current flows from said p-region to said n-region but no reverse current flows from said n-region to said p-region; and
- said p-region having a plurality of conductor strips arranged electrically, in parallel with each other and in series with said anode, so that if the current reaches a preselected limit, said plurality of conductor strips opens to limit current passed by said circuit; and
- said n-region having a plurality of conductor strips arranged electrically in parallel with each other and in series with said cathode, so that if the current reaches a preselected limit, said plurality of conductor strips of said n-region and said plurality, of conductor strips of said p-region open to limit current passed by said circuit.

8. The electrical circuit element as recited in claim 7, wherein said plurality of conductor strips are severed to program device for said preselected limit to said current.

9. The electrical circuit element as recited in claim 7, wherein said plurality of conductor strips are made of a material selected from the group consisting of germanium, gallium arsenide, copper, and aluminum.

10. The electrical circuit element as recited in claim 7, wherein said plurality of conductor strips are between 1 to 10 microns in thickness.

\* \* \* \* \*